C. W. SHERMAN.
CAR WHEEL.
APPLICATION FILED JUNE 1, 1916.
1,257,411.
Patented Feb. 26, 1918.
5 SHEETS—SHEET 5.
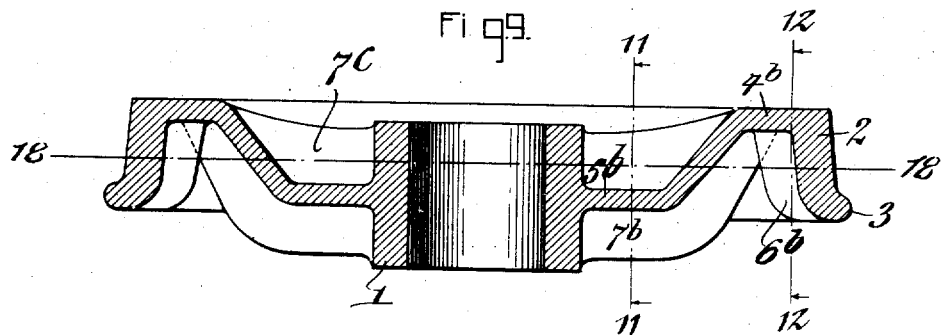
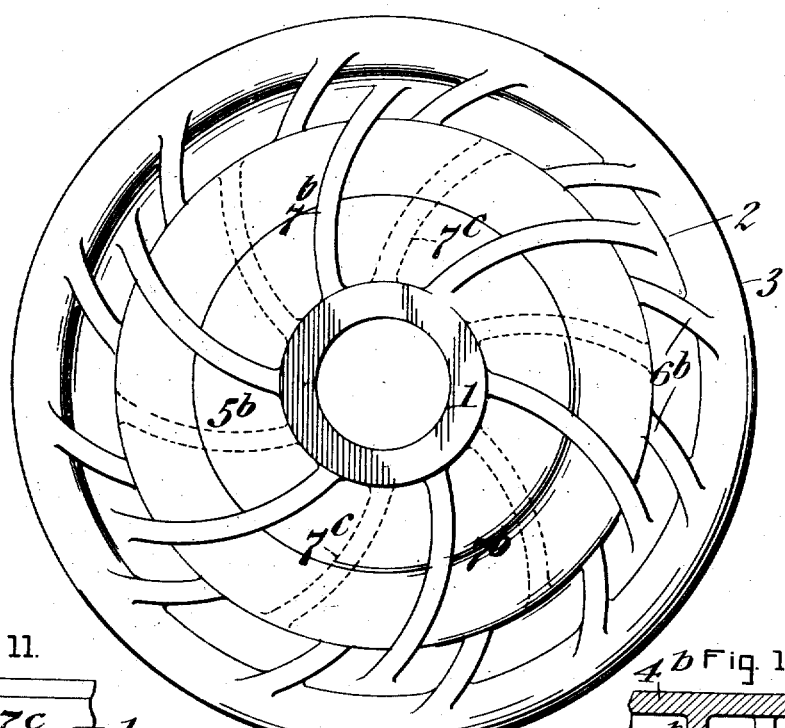
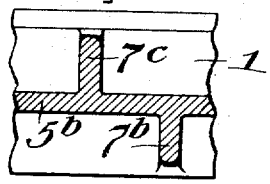
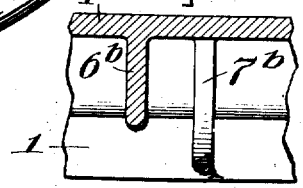
WITNESSES.
Julius J. Pribble
M. Ray Taylor
INVENTOR
Clifton W. Sherman
by Genes Robb
ATTORNEYS.

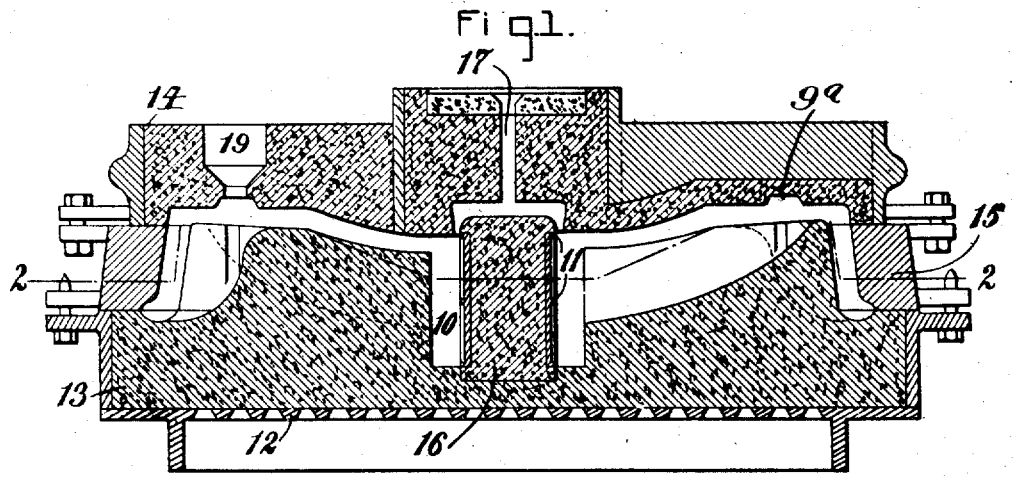
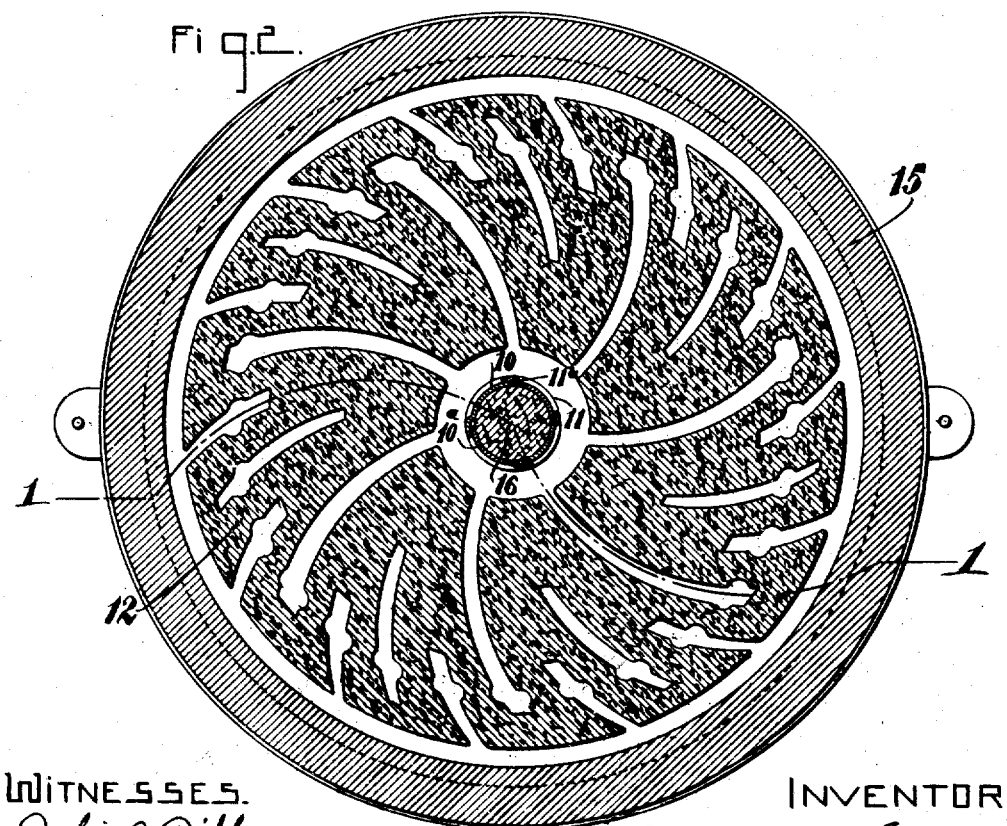

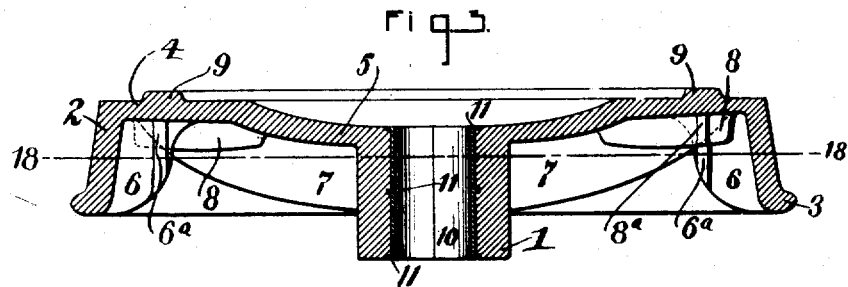
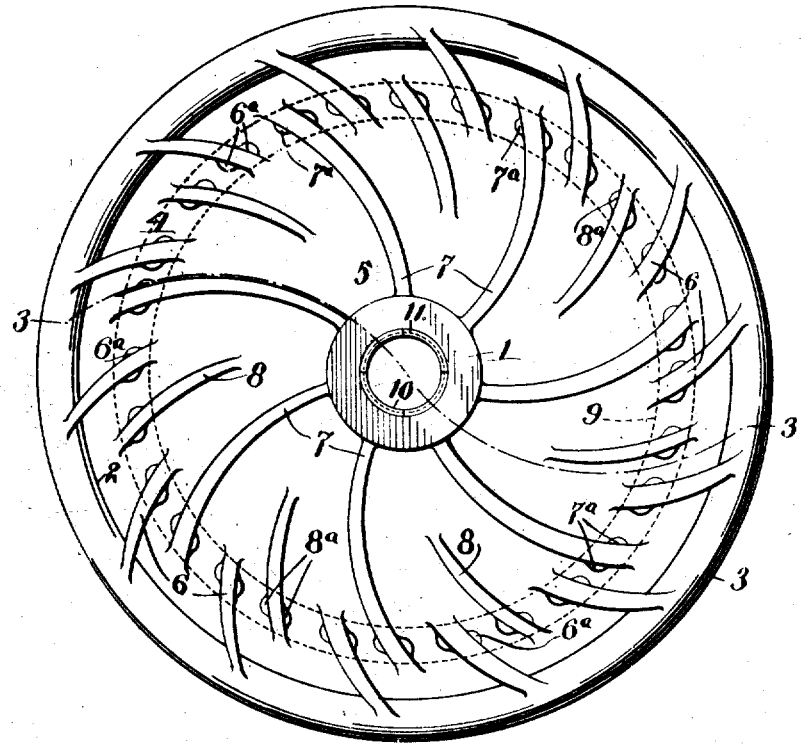

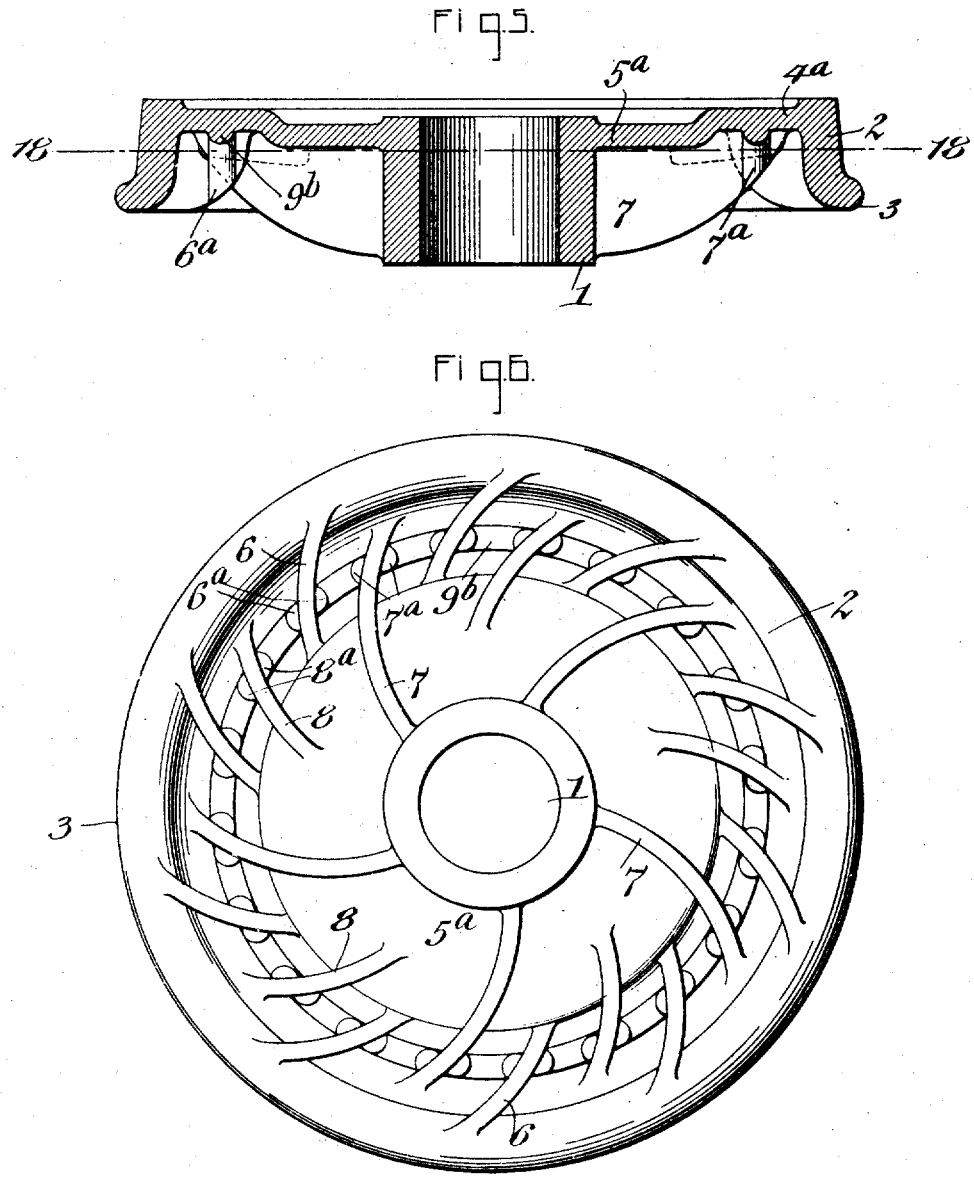

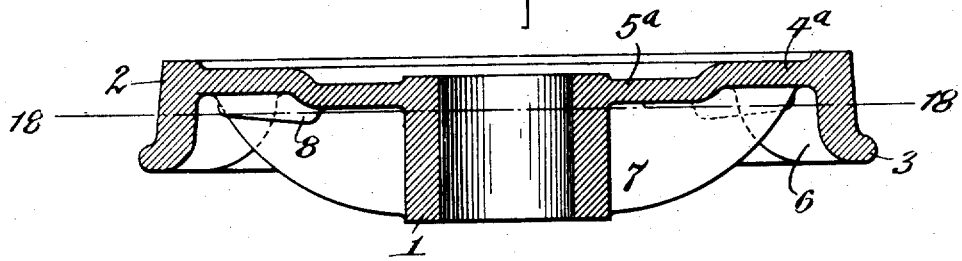
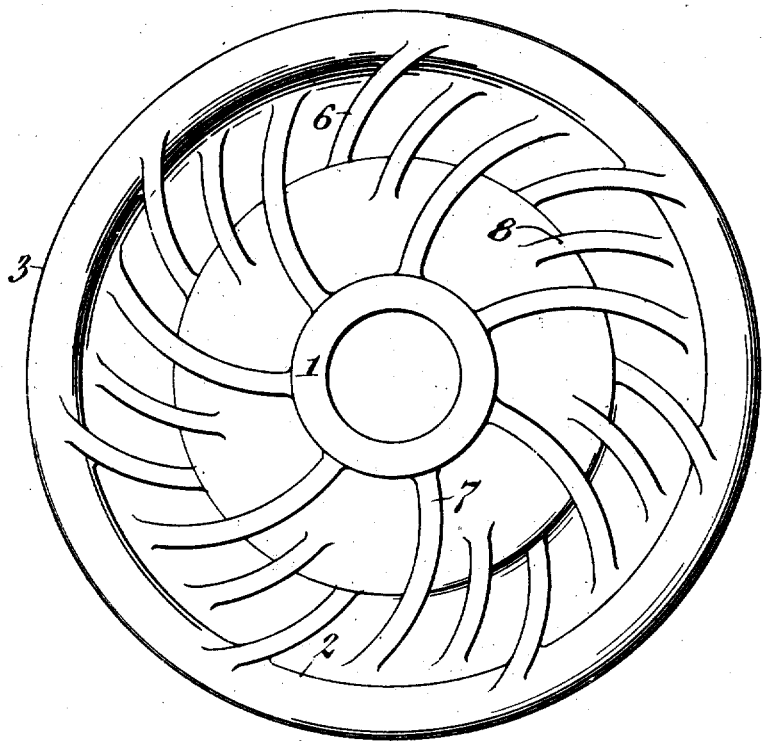

UNITED STATES PATENT OFFICE.

CLIFTON W. SHERMAN, OF BUFFALO, NEW YORK.

CAR-WHEEL.

1,257,411.  Specification of Letters Patent.  Patented Feb. 26, 1918.

Original applications filed September 8, 1914, Serial No. 860,557, and November 3, 1914, Serial No. 870,057.
Divided and this application filed June 1, 1916. Serial No. 101,133.

*To all whom it may concern:*

Be it known that I, CLIFTON W. SHERMAN, a citizen of the United States, residing at Buffalo, in the county of Erie and State of New York, have invented new and useful Improvements in Car-Wheels, of which the following is a specification.

This invention relates to an improvement in the construction of integral cast metal car wheels.

The invention has for its object the production of cast car wheels in which the formation of the different sections is such that the bearing surface of the tread or rim is hard and has increased wearing capacity; to so distribute the metal in the supporting plate and brackets that a casting is produced without shrinkage strains, spongy spots or other deformation which would impair the strength of the casting and produce the tread or rim and its flange with maximum rapidity in order to eliminate formation strains. This application is in part a division of an application filed by myself November 3, 1914, Serial #870,057, and an application filed September 8, 1914, Serial #860,557.

In the accompanying drawings:

Figure 1 is a vertical section of a molding flask for producing one form of car wheel embodying my invention, the section being taken on line 1—1, Fig. 2. Fig. 2 is a horizontal section taken on line 2—2, Fig. 1. Fig. 3 is a vertical section of one form of car wheel embodying my improvements which is produced in the mold shown in Figs. 1 and 2 and which is taken on line 3—3, Fig. 4. Fig. 4 is a bottom plan view thereof. Fig. 5 is a vertical section showing another form of integral cast metal car wheel containing my invention. Fig. 6 is a bottom plan view thereof. Fig. 7 is a vertical section showing a further form of integral cast metal car wheel embodying some features of my invention. Fig. 8 is a bottom plan view of the same. Fig. 9 is a vertical section showing still another form of integral cast metal car wheel containing some features of my invention. Fig. 10 is a bottom plan view of the same. Figs. 11 and 12 are fragmentary sectional views taken on lines 11—11 and 12—12, Fig. 9, respectively.

Similar characters of reference indicate corresponding parts throughout the several views.

In its general construction, the wheel containing my improvements and shown in Figs. 3 and 4 comprises a hub 1, an annular rim or tread 2 arranged concentrically around the hub and provided at its lower or back edge with a laterally projecting annular flange 3, and a body connection or supporting member arranged between the hub and rim and connecting the same. The upper front unflanged edge of the rim is arranged higher or above the upper end of the hub, as shown in Fig. 3. Although the body or supporting member may be variously constructed so far as the details are concerned, that shown in Figs. 3 and 4 comprises a horizontal plate or disk which is dished downwardly and connected at the outer edge of its elevated front part 4 with the upper unflanged edge of the rim while the inner edge of the rear depressed part 5 of said plate is connected with the upper or front end of the hub, an annular row of outer brackets 6 connecting the underside of the plate with the rim and terminating at their inner ends short of the hub and an annular row of inner brackets 7 connecting the underside of said plate with the hub and terminating at their outer ends short of the rim.

In addition to the inner and outer brackets the plate is preferably provided on its underside with an annular row of intermediate brackets 8 which terminate at their outer and inner ends short of the rim and hub, respectively. The several brackets are interspaced or staggered relatively to each other in a direction circumferentially of the wheel and the inner ends of the outer brackets and the outer ends of the inner brackets overlap each other, while the intermediate brackets overlap the opposing ends of the inner and outer brackets, as shown in Fig. 4. The outer brackets are preferably so constructed that the sectional area of the same gradually increases from the outer ends toward the inner ends thereof, the inner brackets gradually increase in sectional area from their inner ends toward their outer ends, the intermediate brackets gradually increase in sectional area from their outer and inner ends toward the central parts of the same, and the plate gradually increases in sectional area from its inner and outer edges to the inner ends of the outer brackets and the outer ends of the inner brackets for a purpose which will presently appear.

If desired, the plate may also be provided with an annular strengthening bead 9 which may be arranged on its upper side between the hub and rim and connect sectionally with the outer brackets, the inner brackets, and the intermediate brackets. Each of the brackets may be further provided on its opposite sides adjacent to said bead with lugs, swells or ribs, as shown at 6ª, 7ª, 8ª, for a purpose which will be explained hereinafter. The various elements of the wheel just described are all formed integrally.

Within the bore of the hub the same may be provided with an inner chill, lining or tool piece 10 preferably of tubular form and constructed of soft or low carbon steel. This lining is preferably secured to the hub by placing the lining within the mold in which the wheel is cast, so that a fused joint is produced between the hub and lining which knits the same together as effectively as though the same were constructed in one piece of metal. To further secure the hub and lining against longitudinal displacement relatively to each other the periphery of the lining is provided with a plurality of laterally projecting members 11 which are preferably in the form of annular ribs, flanges or collars and which are embedded in the metal of the hub so that the lining is securely anchored against displacement. Ordinarily the pouring of molten metal against or around cold metal, as occurs when pouring metal against the metal hub lining, would produce cracks in the casting owing to the expansion of the cold metal which prevents proper shrinkage of the casting. This difficulty is overcome in the present instance by making the hub lining collapsible or contractible and in the preferred construction of this lining, this is accomplished by making the same of a plurality of sections which are separated from each other by longitudinal joints 10ª, the space or gap at each of these joints being bridged by a longitudinal flange 11ª arranged on the longitudinal edge of one lining section and lapping over the opposing longitudinal edge of the adjacent lining section, as shown in Fig. 2.

A wheel of this construction when produced by casting the metal of the hub against the soft steel lining produces a hub the bore of which can be easily machined to fit the axle upon which the same is to be mounted. The bearing surfaces of the rim and flange are also made solid and hardened by pouring the metal forming these parts against a heavy chill. The nature of the metal forming the rim section of the wheel is such as to produce hardness or lend itself to be hardened under proper heat treatment and rapid cooling. Owing to the above described construction of the wheel, the formation of the flanged rim is effected rapidly and uniformly while the pouring of the metal proceeds at a uniform rate into the mold at the hub, and during such pouring, the formation of the flanged rim does not begin until practically the entire hub and the inner parts of the body or connection are formed comprising the depressed rear part of the plate, the inner brackets and the intermediate brackets.

A mold suitable for producing this wheel is represented in Figs. 1 and 2 and as there shown, the same comprises a bottom plate 12, a drag or nowel 13 filled with sand and resting on the bottom plate and forming the lower section of the molding flask, a cope 14 filled with sand and forming the upper section of the flask, an iron chill, chiller or chill ring 15 arranged between the drag and cope and forming the intermediate part of the flask, and a core 16 arranged centrally in the flask. The lining 10 is placed in the mold around the core 16, the joints between the lining sections at the upper and lower ends thereof being closed by the adjacent parts of the sand in the flask and the outer longitudinal edges of these joints being closed by a wash of clay or the like. The fluid metal is poured into the cavity formed between the several flask members through a gate or sprue 17 which is formed in the central part of the cope and opens into the upper end of the hub section of the mold cavity.

The outer chill or chiller 15 preferably forms that part of the mold which extends from the back or upper side of the rim flange upwardly across and above the load line 18 of the wheel so that the bearing surface of the flange and the adjacent part of the bearing surface of the rim which receive the wear of the load is densely formed and hardened. The load line is located on the periphery of the rim approximately half way between the upper or front and the lower or rear edge of the same, as shown in Fig. 3.

At a suitable number of places the cope of the molding flask may be provided with risers 19 which open into the mold cavity at the heaviest sectional area of the brackets and plate. This heavy sectional area can be located at any suitable point between the rim and the hub, it being the aim to keep this area of molten metal in a pasty or jelly-like condition until the heavier rim and hub sections have congealed with the assistance of the chillers 10 and 15 and thus assist in relieving the strain on the lighter plate and bracket sections.

As the molten metal is poured through the sprue into the mold cavity, the same first enters the hub cavity and begins filling the latter from its lower end upwardly. After the lower end of the hub has been formed the continued rise of the metal then begins the formation of the inner brackets and by the time the metal reaches the top of the hub cavity the depressed lower or rear part of the plate and the intermediate brackets have been formed. Up to this time the metal has not yet entered the rim cavity and no part of the rim or its flange and adjacent parts of the wheel have been formed. As the molten metal surrounds the cold hub lining or chill, the latter becomes heated and tends to expand but owing to the slack joints beween sections of the lining, the latter collapses by one section sliding circumferentially on another thereby also compensating for the contraction of the hub when the same cools and hardens, so that no cracks are formed in the hub. When the metal rises to that part of the mold cavity where the central part of the plate cavity joins with the elevated bead cavity and the inner elevated ends of the outer bracket cavities, the continued inflow of metal through the sprue causes the metal thenceforth to flow rapidly downwardly and outwardly through the outer bracket cavities and fill the rim cavity so that the rim quickly forms with the outer brackets and when the metal reaches the top of the rim, the upper front or elevated part of the plate and the adjacent part of the intermediate brackets have also been filled. In this manner the inner part of the wheel will be formed first followed by the formation of the outer part and the molten metal will rise twice as fast as usual in the mold, particularly in the tread section, with a given speed of pouring. After the mold cavity as a whole has been filled the continued inflow of metal for a brief period through the sprue causes a quantity of the metal to enter the risers 19 and form a surplus or head of molten metal in the same.

The above described quick and uniform formation of the flanged rim section is secured while the molten metal enters the mold cavity at a uniform rate throughout the casting operation.

The metal lying against the rim chill and hub chill shrinks, solidifies and contracts first and the plates and brackets and inner side of rim and outer side of hub sections are properly fed by the head or surplus of reserve molten metal in the risers which flows from the same outwardly through the outer brackets and outer parts of the plate, bead and intermediate brackets to the rim, and inwardly through the inner brackets and inner parts of the plate to the hub, thereby compensating or allowing for any shrinkage and contraction in the metal forming the plate, rim and hub and preventing the formation of any defects which would weaken or affect the strength of the wheel, such as shrinkage holes, spongy spots or piping. The pressure of molten metal tends to strain the congealed circular rim section. This combined with the resistance of the congealed plate section during the cooling period tends to form vertical cracks on the bearing surface of the rim or tread commonly known as chill cracks. In the present case this is avoided because the cavity in the mold forming the bead serves as a gate which properly distributes the metal from the head or risers 19 to all the brackets and all parts of the plate section and the inner part of the rim and the outer part of the hub, and in the finished wheel the bead 9 formed in the bead cavity 9$^a$ materially strengthens the wheel. The movement of the metal from the risers to the rim and hub in the manner described is facilitated by the gradual enlargement of the sectional area of the mold cavity from the rim cavity inwardly toward the risers 19 and from the hub cavity outwardly toward these risers, this being secured by enlarging the plate from the hub and rim toward the risers, enlarging the outer brackets inwardly, enlarging the inner brackets outwardly, enlarging the intermediate brackets from their extremities to the bead which connects the central parts of the last mentioned brackets and by the cavities forming the swells 6$^a$, 7$^a$ and 8$^a$ on the brackets, thereby allowing proper contraction of the rim section in its congealed state and avoiding the defective deformation of vertical chill cracks in the face of the tread. This enlargement of the plate brackets also tends to slow up the setting of the metal contained therein which allows the circumferential and radial shrinkage and contraction of the previously congealed tread section to take place without producing the defects known as chill cracks.

The objects of this increased sectional area of the plate and brackets are thus attained, one to properly assist in feeding the molten metal to the plate and bracket sections adjacent to the rim, and the other to keep this sectional area molten so that the rim section can properly contract without developing shrinkage strains, spongy spots, piping or other defects.

The chilling of the tread increases the density of the metal as well as its hardness. The chilling of the hub with a lighter chiller only increases the density of the metal in the same because in the proper formation the hub should be soft and strong. In the manufacture of a wheel of this kind, a high carbon metal is preferably employed which will produce steel too hard for easy machining. The use of an inner hub lining or chill made of soft steel is therefore desirable in order to facilitate the boring or machining of the hub so that the wheel may be properly fitted on its axle. A secondary object of the chill lining in the hub is to increase the density of metal in the hub, not its hardness, thereby avoiding the use of heavy gates or risers, because it will tend to cool this heavy section of metal quickly and thereby make a uniform and dense casting of the hub.

It will be apparent from the foregoing that a car wheel made in accordance with my invention will be practically free from any defects due to shrinkage strains or other improper formation or conditions which are present in wheels made in accordance with the method theretofore commonly practised.

My improved wheel is therefore much stronger and safer and these advantages are secured in addition to a material decrease in the weight of the wheel and therefore in the cost of the same.

By constructing an integral cast metal car wheel in the manner described a sequence or rhythm of shrinkage and contraction of formation is produced from a point where the radial chilling effect ceases to where the casting is fed with molten metal. Inasmuch as it is the constant aim in the manufacture of car wheels to pour the molten metal against the chiller in as short a time as possible it may be assumed that the casting of practically all wheels is completely formed before the metal in any part of the wheel is set with the exception of that part of the metal which is in contact with the chiller and therefore solidifies instantaneously. In the present design of car wheel in which the sections of the metal gradually increase from the point where the chilling effect of the chillers leave off to a point where the compensation for shrinkage or feeding of the metal in the casting last to solidify takes place, a solid casting is produced having its full inherent strength of metal in every part thereof and free from all shrinkage holes or spongy spots. Experience has demonstrated that the feed of metal into a mold for producing wheels from a given point in the hub is not conducive to securing the best results on account of the area to be fed being too large for the section and it is for this reason that additional risers 19 have been provided between the rim and hub and the sectional area of the wheel has been enlarged from both the hub and the rim toward these risers. The circumferential shrinkage of a steel wheel is so great, being about two and one-quarter inches in a wheel having a diameter of 33 inches, that the tread or rim will tear or chill crack vertically unless an enlarged or compensation section is placed adjacent to the rim, similar to the bead 9, whereby this metal bead remains in a fluid, pasty or jelly-like condition for a sufficient length of time to allow free contraction of the hot and solid but very weak annular rim section of metal against the chiller. During the formation period of a casting the larger sections, which are hotter and therefore weaker, are more of a jelly-like nature than the lighter sections which have previously passed through this stage. As a casting cools its molecular affinity increases the maximum when normal and if the casting is properly fed it will have strength relative to its sectional area.

In the modified construction of wheel containing my invention, shown in Figs. 5 and 6, the compensating or reinforcing annular bead $9^b$ is shown on the under or rear side of the plate $4^a$, $5^a$ between the rim 2 and hub 1 so as to connect integrally with the plate and inner, outer and intermediate brackets and also with the compensating beads, lugs or ribs $6^a$, $7^a$ and $8^a$ on these brackets.

In the construction of the wheel shown in Figs. 7 and 8, the reinforcing or compensating bead and also the compensating lugs on the brackets are omitted which may be done if the advantages secured by such a bead and lugs are not required in the wheel.

In the construction of wheel embodying my invention shown in Figs. 9 and 10 an annular row of inner rear brackets $7^b$ are provided which connect the convex rear side of the plate $4^b$, $5^b$ with the hub 1, a set of inner front brackets $7^c$ is provided to connect the concave front side of this plate with the front end of this hub and a set of outer rear brackets $6^b$ is provided which connect the rim 2 with the rear side of this plate adjacent to the rim. The several sets of brackets in the last mentioned construction of wheel are staggered relatively to each other in a direction circumferentially of the wheel, as shown in Fig. 10, so that no unduly thick sections are present in the wheel at any particular place.

By employing the inner lining within the bore of the hub the requisite softness is obtained in the latter to permit of easily machining or boring the same to fit the axle upon which the same is to be mounted.

In all of the various constructions of wheels shown and described the metal in the body which is interposed between the rim and hub is so distributed that the metallic communication between the rim and the body is effected solely above the load line of the wheel rim, whereby the rear part of the hub and the inner parts of the plate and adjacent parts of the brackets are always formed first and the rear part of the rim is formed after the formation of the inner parts of the plate and adjacent brackets, whereby first the flanged rear part of the rim and then the unflanged front part thereof are formed rapidly against the chill and the advantages in the construction above described are obtained.

A feature of special importance in the construction of the several car wheels herein shown is that in each form of wheel the connection between the plate and the rim is above or in front of the load line of the tread on the rim and that when the wheel mold is in the casting position, the vertical rise of the metal in the mold, while the same is being poured against the chiller, is continuous and at a practically uniform speed from the time the flange section of the rim is formed to a point above the load line or center line of the wheel on the tread of the rim.

I claim as my invention:

1. An integral cast wheel having the front edge of its rim on one plane and the front edge of its hub on a lower plane, and a plate connecting with the front edges of the rim and hub, said plate having its outer part flush with the front edge of said rim and sloping from its outer part downwardly to the front edge of said hub.

2. An integral cast wheel having the front edge of its rim on one plane and the front edge of its hub on a lower plane, a plate connecting with the front edges of the rim and hub and brackets arranged on the rear side of said plate and connected with said hub and rim, said plate having its outer part flush with the front edge of said rim and sloping from its outer part downwardly to the front edge of said hub.

3. An integral cast metal car wheel comprising a hub, a rim surrounding the hub, a plate connected at its inner edge with said hub and at its outer edge with the front edge of said rim, inner brackets connecting said plate and hub and having their outer ends arranged on a line with the front edge portion of said rim and an annular bead arranged on said plate between said hub and rim.

4. An integral cast metal car wheel comprising a hub, a rim surrounding the hub, a plate connected at its inner edge with said hub and at its outer edge with the front edge of said rim, outer brackets connecting said plate and rim and having their inner ends arranged on a line with the front edge portion of said rim, an annular bead arranged on said plate between said hub and rim, and lugs arranged on said brackets in line with said bead in the direction of the axis of the wheel.

5. An integral cast metal car wheel comprising a hub, a rim surrounding the hub, a plate connected at its inner edge with said hub and at its outer edge with the front edge of said rim, inner brackets connecting the hub and plate, outer brackets connecting said rim and plate, and intermediate brackets arranged on said plate, said brackets being staggered relatively to each other in a direction circumferentially of the wheel, and the inner ends of the outer brackets and the outer ends of the inner brackets being arranged on a line with the front edge portion of the rim.

6. A car wheel comprising a hub, a rim, a laterally projecting flange at one edge of said rim, and a supporting body connecting said rim and hub and comprising a plate extending from said rim to the hub, inner brackets extending from the underside of said plate to the hub, outer brackets extending from the underside of said plate to the rim, the outer ends of said inner brackets and the inner ends of said outer brackets being staggered or interspaced, lugs arranged on said brackets, and an annular bead arranged on said plate between the hub and rim.

7. A car wheel comprising a hub, a rim, a laterally projecting flange at one edge of said rim, and a supporting body connecting said rim and hub and comprising a plate extending from said rim to the hub, inner brackets extending from the underside of said plate to the hub, outer brackets extending from the underside of said plate to the rim, the outer ends of said inner brackets and the inner ends of said outer brackets, overlapping each other, and intermediate brackets arranged on the underside of said plate and staggered or interspaced with said outer and inner brackets, said brackets being provided with lugs.

8. A car wheel comprising a hub, a rim, a laterally projecting flange at one edge of said rim, and a supporting body connecting said rim and hub and comprising a plate extending from said rim to the hub, inner brackets extending from the underside of said plate to the hub, outer brackets extending from the underside of said plate to the rim, the outer ends of said inner brackets and the inner ends of said outer brackets overlapping each other, intermediate brackets arranged on the underside of said plate, lugs arranged on said brackets and an annular bead arranged on said plate and connecting said inner, outer and intermediate brackets.

9. A car wheel comprising a hub, a rim having an annular outwardly projecting flange at its lower edge and an unflanged upper edge, a plate which connects the hub with said rim and which has its outer part elevated and its inner part depressed, inner and outer brackets arranged on the underside of said plate, lugs arranged on said brackets and an annular bead arranged on said plate and connecting the opposing ends of said inner and outer brackets.

10. A car wheel comprising a hub, a rim having an annular outwardly projecting flange at its lower edge and an unflanged upper edge, a plate which connects the hub with said rim and which has its outer part elevated and its inner part depressed, inner, outer and intermediate brackets arranged on the underside of said plate and interspaced relatively to each other, lugs arranged on said brackets and an annular bead arranged on said plate and connecting said brackets.

Witness my hand this 13th day of May, 1916.

CLIFTON W. SHERMAN.

Witnesses:
G. HARRIS,
R. G. ADAMS.